(No Model.)
N. P. DUNCAN.
CASING OR SHIELD FOR POTS OR KETTLES.
No. 571,829. Patented Nov. 24, 1896.
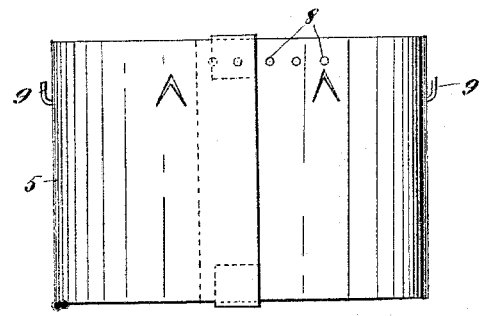
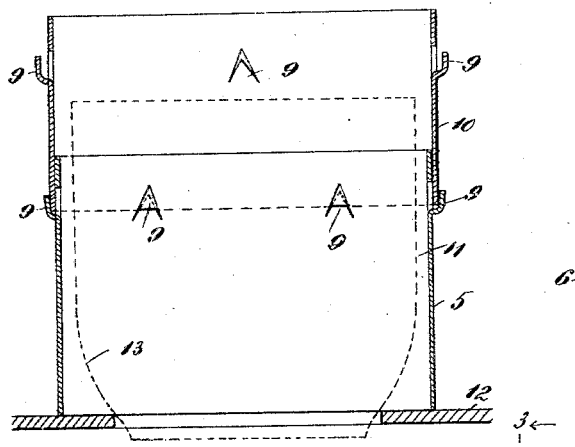
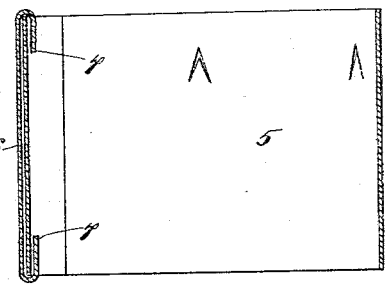
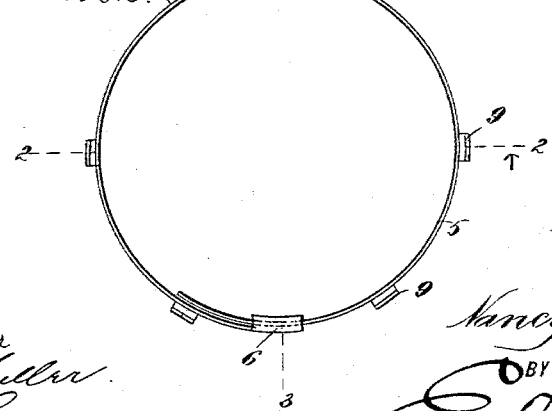
WITNESSES
John Buckler
L. M. Muller
INVENTOR
Nancy P. Duncan,
BY
Edgar Tate & Co.
ATTORNEYS

UNITED STATES PATENT OFFICE.

NANCY PATTERSON DUNCAN, OF PITTSBURG, PENNSYLVANIA.

CASING OR SHIELD FOR POTS OR KETTLES.

SPECIFICATION forming part of Letters Patent No. 571,829, dated November 24, 1896.

Application filed August 5, 1896. Serial No. 601,735. (No model.)

*To all whom it may concern:*

Be it known that I, NANCY PATTERSON DUNCAN, a citizen of the United States, and a resident of Pittsburg, in the county of Allegheny and State of Pennsylvania, have invented certain new and useful Improvements in Casings or Shields for Pots or Kettles, of which the following is a specification, reference being had to the accompanying drawings, forming a part thereof, in which similar letters of reference indicate corresponding parts.

The object of this invention is to provide an improved shield or casing for pots or kettles, steamers, boilers, and similar devices, such as are usually employed on stoves and ranges for cooking purposes, a further object being to provide means whereby various articles of food, such as vegetables and meat, may be more perfectly cooked in pots or kettles with a less amount of heat without danger of overcooking or water-soaking the same.

It is a fact well known that in cooking many articles in pots or kettles the bottom portion thereof is frequently thoroughly cooked before the upper portion, and by the time the upper portion is done the bottom portion is overcooked or water-soaked. This effect is produced by reason of the fact that the heat is applied directly to the bottom and no other part of the pot or kettle and that too much heat must necessarily be employed, and the further fact that the air, when allowed to come freely in contact with the sides of the pot or kettle, cools the same and causes too great a radiation of the heat therefrom, whereby the upper portion thereof is kept comparatively cool. In order to obviate these objections, I provide an adjustable cylindrical casing or shield, which, when properly adjusted, is slightly larger than the pot or kettle, and which is adapted to be placed upon the range or stove so as to inclose the same and thus prevent the air from coming in contact therewith, an annular space being preferably left between the side walls of the pot or kettle and the casing, which not only excludes the cool air, but confines the heat coming up between the casing or shield and the pot or kettle and also the heat of said casing or shield and said pot or kettle, thus insuring an even and thorough cooking of the whole contents of the pot or kettle with very much less heat and thus lessening the risk of scorching or overcooking and also the amount of heat within the kitchen and the cost of the fuel employed; and the casing or shield which I employ is preferably composed of sheet metal, but other material may be used.

The invention is fully disclosed in the following specification, of which the accompanying drawings form a part, in which—

Figure 1 is a side view of the casing or shield which I employ; Fig. 2, a transverse vertical section thereof; Fig. 3, a plan view; and Fig. 4 is a sectional view showing the method of applying the same, and showing also a supplemental shield or casing which is used in connection with pots or kettles of unusual height or in connection with steamers or boilers used on top of the pot or kettle.

In the practice of my invention I provide a cylindrical casing or shield 5, which is preferably composed of a strip of sheet metal about thirty-six inches long by ten inches in width, but these dimensions are immaterial and may be varied to suit conditions. The strip of metal is bent into circular form, as clearly shown in Figs. 1 and 2, and the ends thereof are connected by a metal clamp 6, which is preferably composed of a strip of sheet metal, the ends of which are bent inwardly, as shown at 7, to form hooks within which the separate ends of the shield or casing are placed, and these hooks may be formed so as to hold the said ends in proper position by friction, and thus provide means for adjusting the size of the shield or casing, and I also prefer to perforate the upper edges of the separate ends of the shield or casing, as shown at 8, said perforations in the separate ends of the casing or shield being adapted to correspond or register when the ends are brought together for the purpose of inserting a pin or plug to hold said casing in place, and for providing means for more readily and exactly adjusting one of said ends to the other and for adjusting the separate parts of the shield or casing when more than one part is employed, and it will be understood that the use of the pins or plugs above referred to are not absolutely essential.

Formed on the upper portion of the shield or casing are outwardly and upwardly directed hooks 9, which are cut from the material of which said shield or casing is composed, and these hooks or projections are designed to support a supplemental shield or casing 10, which is employed where pots or kettles of unusual height are used, and the supplemental casing or shield 10 may also be provided with the hooks or projections 9, which may be used to support an additional shield or casing, but this arrangement is not essential, and I prefer to form the supplemental shield or casing of different widths, so that those using the same can employ a supplemental shield or casing of such width as to correspond with the requirements of each particular case. The supplemental shield or casing is of very great utility where a steamer is employed on top of the pot or kettle and is very frequently used with a flat lid or cover, which is placed over the whole, on which various articles may be placed in order to keep them warm.

The shield or casing 5 is placed on the stove or range so as to inclose the pot or kettle, as shown in Fig. 4, and so as to provide a narrow annular space 11 between said pot or kettle and said shield or casing, and in Fig. 4 I have also shown at 12 a portion of the top of the stove or range and a pot or kettle 13 in dotted lines. By means of this device it will be seen that the air is entirely excluded from the outer walls of the pot or kettle, and this device is especially advantageous for cooking in the open air and in a room in which the windows and doors are open, but it will also be found of great advantage under all circumstances.

I have found by actual experience that by means of my improvement almost any article can be more quickly, thoroughly, and evenly cooked in a pot or kettle than when said pot or kettle is employed in the usual manner, and that much less heat is necessary, and that the entire mass within the pot or kettle will be cooked at the same time, and the bottom portion thereof will not be overdone, scorched, or water-soaked by the time the upper portion is properly cooked. I have also found that, as a rule, entirely too much heat is employed in cooking articles of food in vessels of this class, the use of a higher degree of heat than is necessary being occasioned by the necessity of heating to a sufficient degree the upper portion of the food within the vessel, and this objection is also avoided by the use of my improved casing or shield, whereby the air is excluded or prevented from coming in contact with the upper part of the vessel during the process of cooking, and a uniform degree of heat is maintained from the bottom to the top thereof. I may also provide a plurality of perforations around the entire top of the shield or casing or form notches or recesses in the top thereof and place a plate or cover or another vessel thereover, and said plate or cover may be employed with or without the perforations or notches or recesses, and by means of this arrangement I also provide means for retaining the heat in the upper portion of the pot or kettle.

My invention is not limited to the material of which the shield or plate is composed, nor to the means herein described for connecting the separate ends thereof, as it is evident that changes in and modifications of the various features of the construction may be made without departing from the spirit of my invention or sacrificing its advantages.

Having fully described my invention, I claim as new and desire to secure by Letters Patent—

1. The herein-described shield or casing, for use in connection with pots or kettles, for cooking purposes, said shield being composed of a strip of metal or similar material, and the ends thereof, being adjustably connected, and said shield or casing being provided near its upper edge with outwardly and upwardly directed hooks or projections which are adapted to support a similar supplemental shield or casing, substantially as shown and described.

2. The herein-described shield or casing for use in connection with pots or kettles for cooking purposes, said shield or casing being composed of a strip of sheet metal or similar material, the ends of which are connected by a transverse clamp of sheet metal or similar material, and being also adjustable so as to regulate the size of the shield or casing, substantially as shown and described.

In testimony that I claim the foregoing as my invention I have signed my name, in presence of the subscribing witnesses, this 1st day of August, 1896.

NANCY PATTERSON DUNCAN.

Witnesses:
AGNES POTTER,
JESSIE D. WILCOX.